No. 650,719. Patented May 29, 1900.
J. & F. H. HAVILAND & J. FARMER.
APPLIANCE FOR ELEVATING AND DISCHARGING GRAIN, &c.
(Application filed Apr. 25, 1899.)
(No Model.) 5 Sheets—Sheet 3.
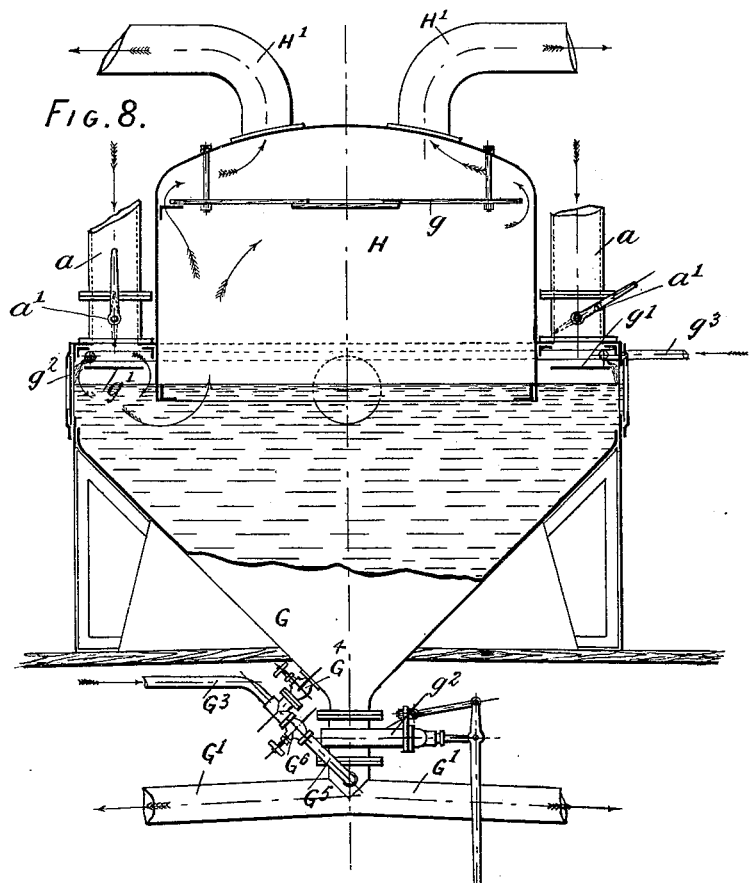
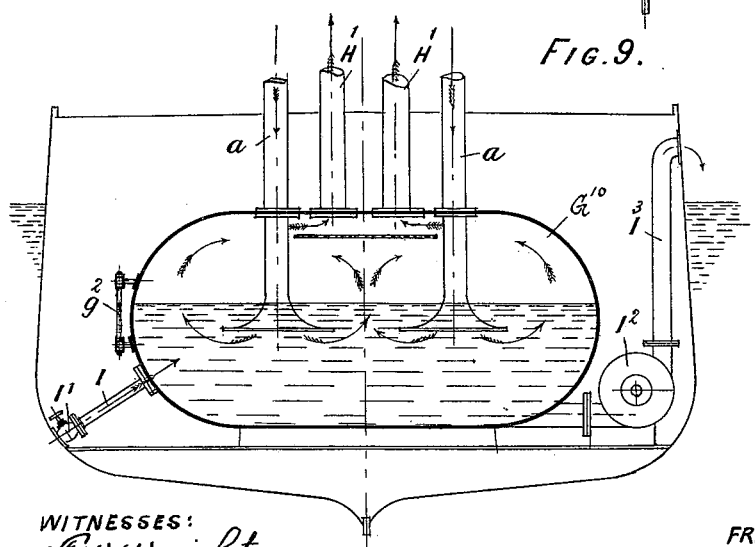
WITNESSES:
F. W. Wright
E. C. Sarles
INVENTORS
JOHN HAVILAND
FREDERICK HENRY HAVILAND
JOHN FARMER
BY Howson and Howson
THEIR ATTORNEYS

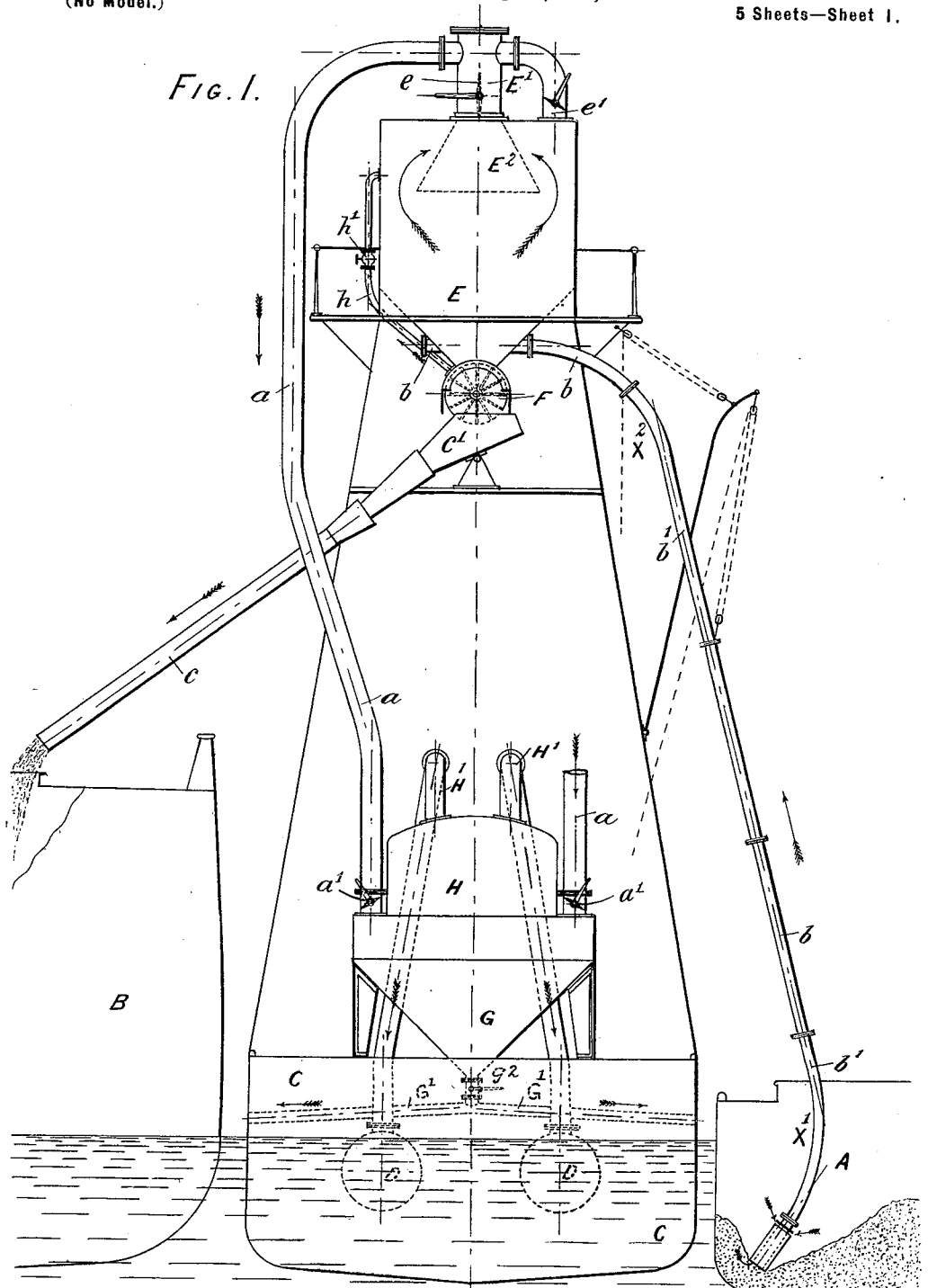

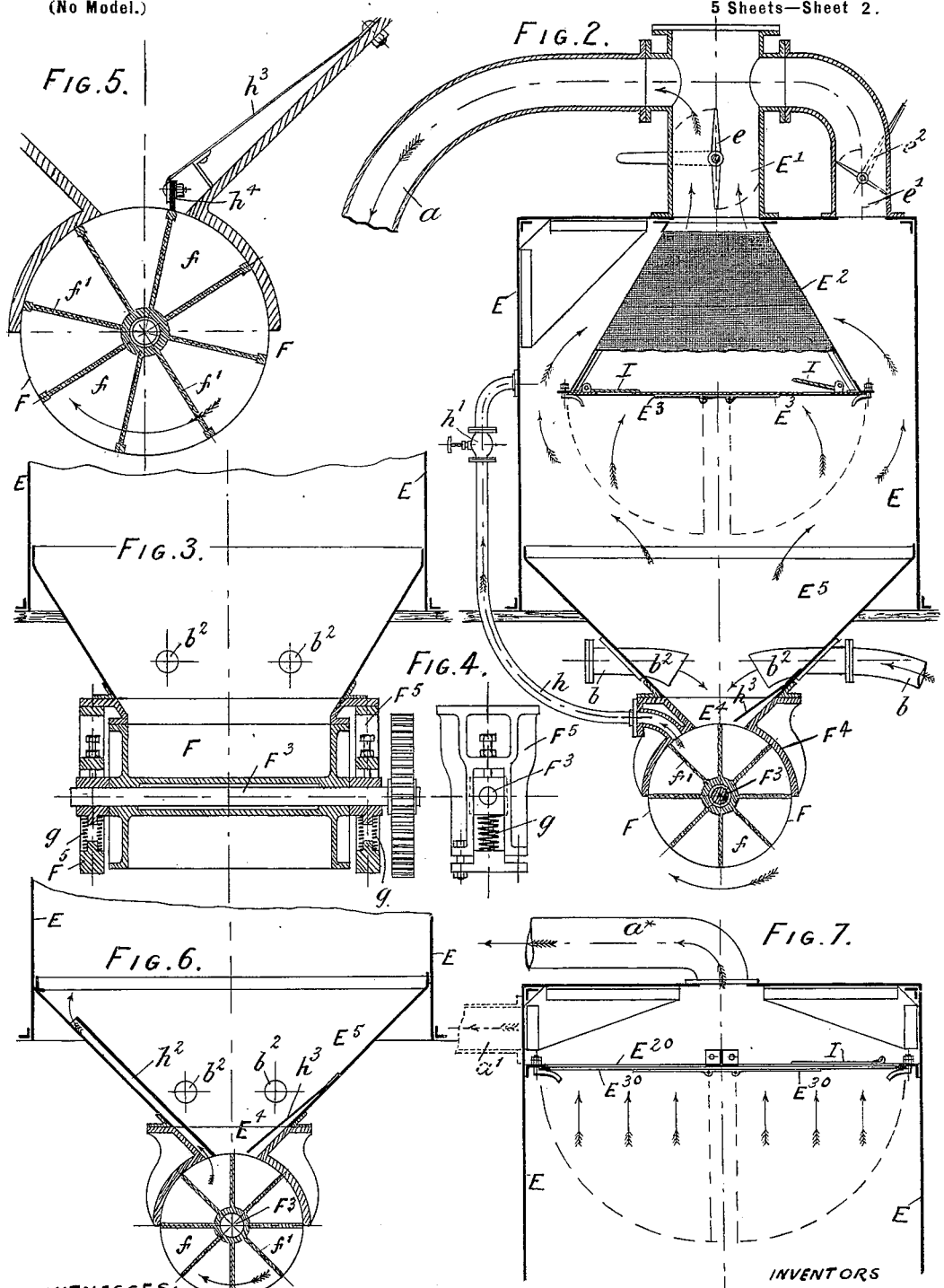

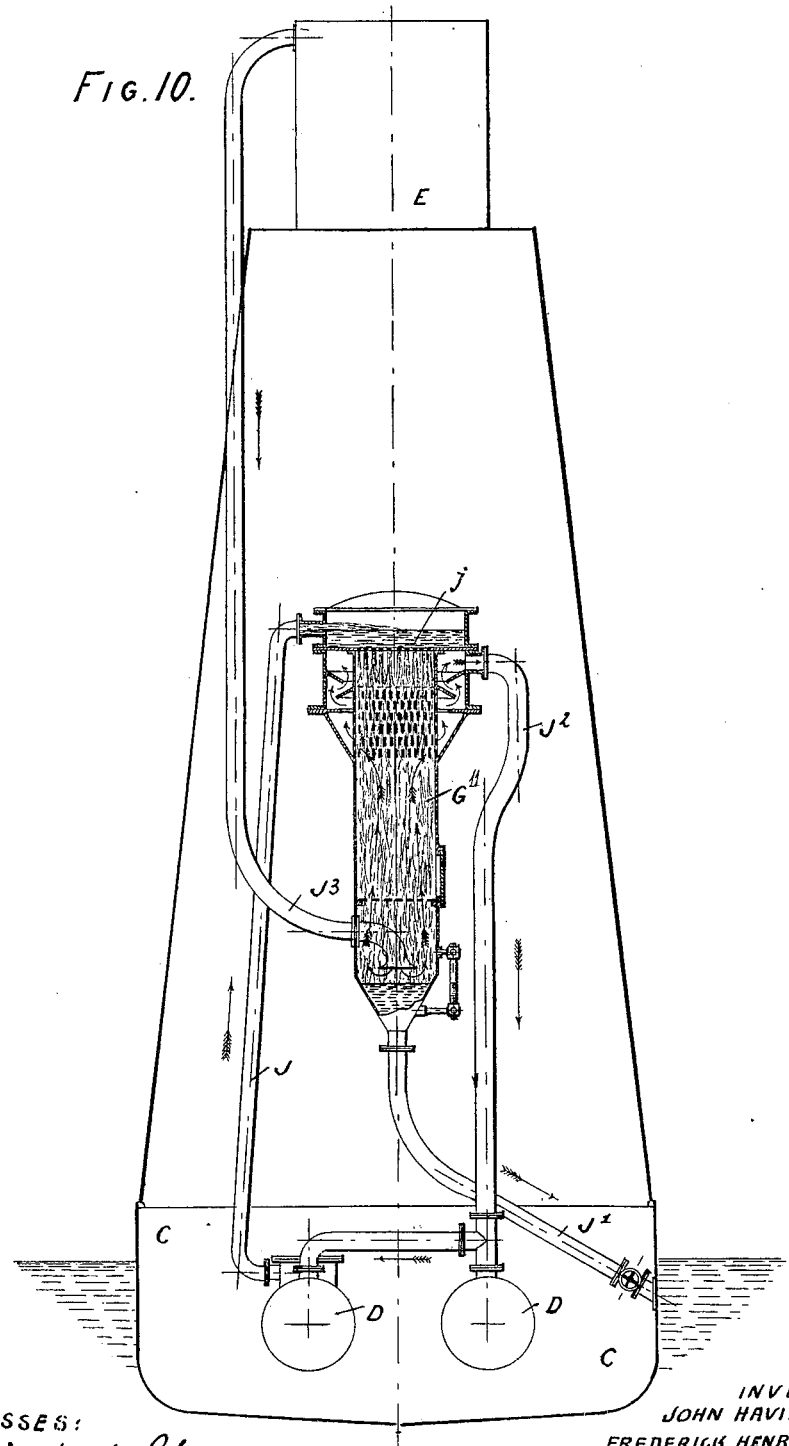

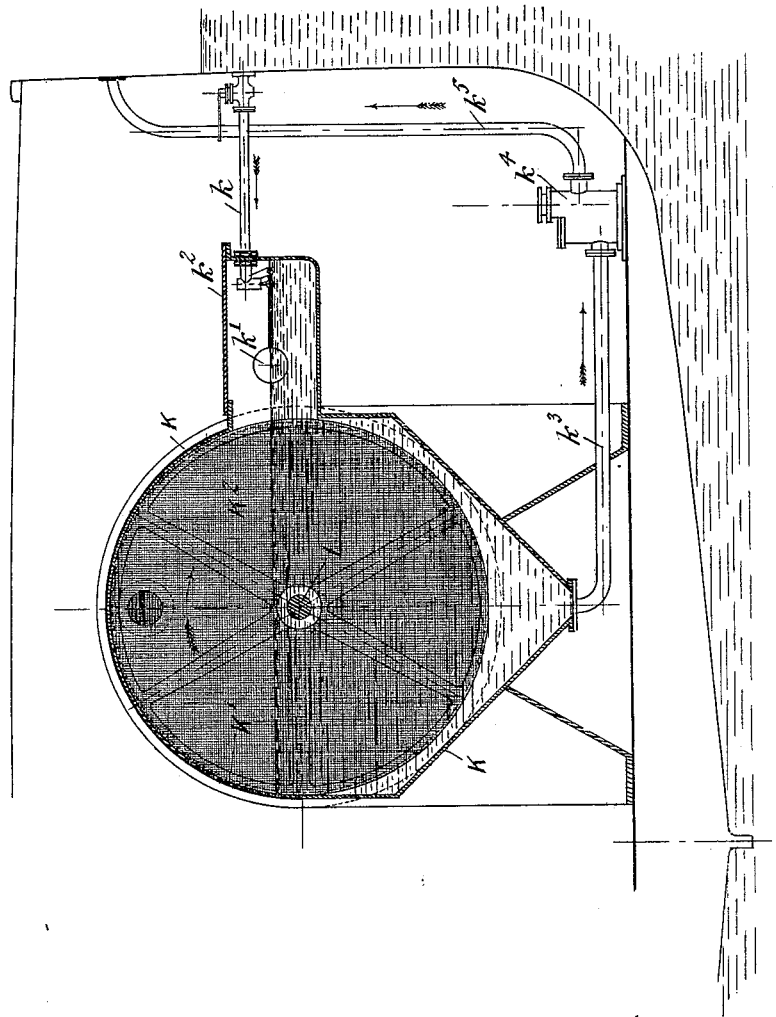
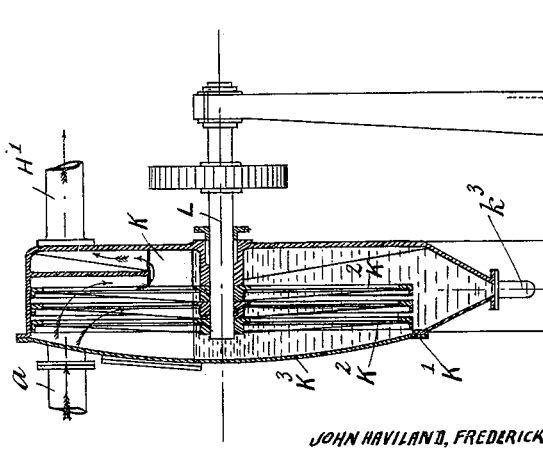

United States Patent Office.

JOHN HAVILAND, OF NORTHAMPTON, AND FREDERICK HENRY HAVILAND, OF BOURNEMOUTH, ENGLAND, AND JOHN FARMER, OF GLASGOW, SCOTLAND.

APPLIANCE FOR ELEVATING AND DISCHARGING GRAIN, &c.

SPECIFICATION forming part of Letters Patent No. 650,719, dated May 29, 1900.

Application filed April 25, 1899. Serial No. 714,412. (No model.)

*To all whom it may concern:*

Be it known that we, JOHN HAVILAND, solicitor, residing at Northampton, and FREDERICK HENRY HAVILAND, solicitor, residing at Bournemouth, England, and JOHN FARMER, engineer, residing at Glasgow, Scotland, subjects of the Queen of Great Britain and Ireland, have invented certain new and useful Improvements in and Relating to Appliances for Elevating and Discharging Grain and the Like, of which the following is a specification.

This invention has reference to improved appliances for elevating and discharging grain by pneumatics, and comprises improved means of separating the dust from the grain, of preventing the latter getting injured, of purifying the air which has elevated the grain before it gets into air-pumps, and in pipe and other fittings connected therewith.

In order that others skilled in the art to which our invention relates may understand how the same may be carried into practice, we have hereunto appended explanatory drawings.

Figure 1 is a diagrammatic elevation showing our complete appliances in operation. Fig. 2 is a sectional elevation of the chamber into which the grain is elevated and the dust-laden air separated therefrom before the grain is discharged into the delivery-pipe. Fig. 3 is a detached longitudinal section of the lower part of chamber and wheel delivery-valve, and Fig. 4 a detached view showing the spring-bearings for spindle of wheel-valve. Figs. 5 and 6 are transverse sections of the wheel-valve and hopper, showing modified fittings; and Fig. 7 is a detached view of the upper part of air-separating chamber, showing a modified form of dust-separating sieve. Figs. 8, 9, 10, 11, and 12 are sectional views illustrating modified forms of the water-trapping vessel and fittings for purifying the air.

Referring to the drawings, in elevating, as shown in Fig. 1, from the hold of a grain-barge A and discharging into a cargo-steamship B a machinery-barge C, containing the requisite pneumatic appliances, is preferably placed between the grain-barge A and the ship B. This barge C is fitted with air-pumping engines D, connected by suction-pipes H' H' to vacuum-chamber H on top of air-purifier G and by pipes $a$ to a large receiver or vacuum-chamber E overhead, some thirty or fifty feet or thereabout, to suit circumstances, from the water, with grain suction and discharging pipes $b$, $b'$, and $c$, respectively, in connection with its lower end, the suction-pipes $b\ b'$ being led from it down to and among the grain in the barge A for emptying the latter, and the discharge-pipes $c$ led to and over the hold of the ship B for filling. The air-pumping engines D on being set to work cause a partial vacuum in the chamber E and draw into it air and grain up the suction-pipes $b\ b'$, and the grain is discharged from pocket-chambers in wheel-valve F, fitted to under side of vacuum-chamber E, into chute $c'$ and into the delivery-pipes $c$, while the separated air is by suction action drawn through the pipes $a$ into the water-trap purifying vessel G, where it gets cleansed before passing to the pumps D.

To prevent more than desired of the dust and light material being drawn from the grain cargo by the vacuum through the pipes $a$ into the air-purifier G, we make suitable arrangements for this, whereby we can also vary the quantity drawn away at will. In the case of discharging maize, where it is generally desired to get rid of the outside fluffy husk that comes from it, provision is made to draw most of this away and deposit it in the purifier G.

We find that in order to make a good serviceable elevator it is requisite to be able to draw off from the cargo or retain in it most of the lighter material when desired. To effect this, we form and fit inside of the vacuum-tank E, under the outside central suction-pipe $E'$, in connection with suction-pipe $a$, leading to purifier G, as shown in Fig. 2, a conical or other shaped skeleton box-chamber $E^2$, covered over with fine, preferably copper wire-gauze of a fineness of mesh such as is used for mosquito-netting or finer, the fineness depending upon the area of gauze-netting used, and having a door or doors $E^3$ for cleaning purposes formed on the under side. We fit into this central suction-pipe a butterfly or other simple form of valve $e$ for opening or closing communication to the gauze chamber $E^2$. We also lead another side suction-pipe $e'$ from this central one and connect it to the top of vacuum-tank E, communicating with it alone and not with the gauze chamber. This pipe $e'$ just above the vacuum-tank is also provided with a butterfly-valve $e^2$ for opening or shutting communication between it and the tank E.

When it is desired to take the least possible amount of dust and other light material from the grain being drawn into the vacuum-tank E, the valve $e^2$ in the side suction-pipe $e'$ is shut and valve $e$ in the central suction-pipe $E'$, communicating with the gauze chamber $E^2$, opened. As nothing can pass into the suction-pipe $E'$ and from it to the purifier G without passing through the gauze $E^2$, the air is thereby filtered from all material larger than the gauze will pass. In case of the gauze through some cause getting clogged up we may fit in one or more doors I, of metal or other material, in the undercovers $E^3$, opening upward to allow the air to pass and prevent the gauze being burst in, these doors acting as safety-valves. These doors may be of sufficient size to also be used as manholes for cleaning purposes.

When it is desired to draw off from the maize being sucked into vacuum-tank E the husky material detached from it or to take a large quantity of the dust from, say, oats or barley, the valve $e$ in central suction-pipe $E'$, communicating with the gauze chamber $E^2$, is shut and the valve $e^2$ in the side suction-pipe $e'$ opened. The sharp suction caused at the mouth of this pipe draws into it readily the husky and other light material and dust floating in the vacuum-tank E and conveys it through the suction-pipes $e'$ and $a$ down to purifier G. By opening the valve $e$ of the central pipe $E'$ slightly, less strength of suction will be maintained in the side pipe $e'$ and less light material drawn in, and this can be varied to suit the requirements of each case as to the amount of cleaning necessary.

Instead of forming a gauze chamber, as described, and shown in Fig. 2, we may, as shown in Fig. 7, fit a framing of gauze $E^{20}$ at some distance from the top inside the vacuum-tank E and hinged so as preferably to form two doors $E^{30}$. One air-suction pipe to purifier would be taken either from the top, as $a^x$, or from the side, as $a'$, of vacuum-tank E, and the dust-laden air made to pass through the gauze $E^{20}$, or when it was not desired to filter the air the doors $E^{30}$ would be let down, when the air with dust and other light material would pass direct into pipe and on to purifier G.

In order to give more area of gauze, the framings may be formed to dip down for a considerable distance inside of the vacuum-tank E.

The revolving wheel-valve F, Figs. 2 to 6, for delivering the grain from the vacuum-chamber E into the chute $C'$ to the discharge-pipes $c$, is driven in any convenient manner, and consists of a series of preferably six or more radial or curved vanes $F'$, which form receptacles or buckets $f$ for the grain and which are closed at each end and fitted with central spindle $F^3$. The wheel-valve F works in a cradle or bearing $F^4$, fixed to the under side of hopper $E^5$, below vacuum-tank E, which has fitted to it the grain-inlet branches $b^2$. The cradle we make one-half or less the diameter of wheel-valve, which prevents jamming through dust from the grain getting in between. The wheel-valve is kept close up against the cradle $F^4$ by spiral or other cushioning springs $g$ or other equivalents placed under the bearings of the wheel-valve spindle $F^3$ and carried by side brackets $F^5$.

When discharging barley and oats containing much dust and light material, we have experienced difficulty at times when experimenting in its being prevented falling into the buckets $f$ of the wheel-valve F and accumulating in the vacuum-tank E, owing to the buckets $f$ being filled with air at the pressure of the atmosphere. To obviate this, we make a communication with the buckets $f$ of the wheel-valve through the cradle $F^4$ and the higher part of the vacuum-tank E, considerably above where the grain is delivered in, by means of a pipe $h$, located outside the vessel E, as shown in Fig. 2, so that as each bucket $f$ passes the open mouth of this pipe $h$ before it has come under the grain-opening $E^4$ in the vacuum-tank E the air is extracted from it and pressure equalized to that of the vacuum-tank. The incoming grain thus falls by gravity easily into each bucket without being shot up into the vacuum-tank, as when the pipe is not fitted through atmospheric air being let into the partial vacuum. In discharging maize, however, owing to the small amount of dust it contains and to its form the want of this pipe $h$ is not so much felt, and where the husks extracted from the maize are required to be drawn away in order to have the best winnowing effect we restore the conditions the same as before the pipe was fitted and allow the atmospheric air from each bucket $f$ as it comes under the grain-opening $E^4$ in the vacuum-tank E to blow through the grain. This we accomplish by fitting a cock or valve $h'$ to the pipe $h$, as shown in Fig. 2, between the wheel-valve F and vacuum-tank E, and closing it when this condition is desired, or instead of a pipe $h$ a partition $h^2$ may be fitted inside the tank E, as shown in Fig. 6, to give a longitudinal opening inside vessel, the top of opening being above level of inlet of grain.

In order the more perfectly to prevent the breakage of grain by shearing between the vanes $f'$ of wheel-valve F and edge of hopper part of cradle $F^4$, we fix a protector-plate $h^3$ within the outlet part $E^4$ of cradle $F^4$, and on the lower end of this plate $h^3$ and running the length of buckets $f$ we may fix a strip of india-rubber $h^4$, as shown in Fig. 5—say about one-fourth or three-eighths of an inch thick or thereabout—which rubs on the top of vanes $f'$ and prevents grain passing. The rubber $f^4$ also yields should any grain get between it and the vanes, and thus prevents breakage.

Fig. 8 shows one modification of our dust water-trap or air-purifier G, placed, as shown in Fig. 1, between the vacuum-tank E and the air-pumping engines D, in which a closed vacuum-chamber H, open on the under side, is let into the main tapering purifier vessel G and sealed with water by a few inches. Suction-pipes H' H' are fitted to top of vacuum-chamber H on top of purifier G and connected to the air-pumps D. Suction-pipes $a\,a$ are connected to hopper $E^5$ in connection with the vacuum-tank E and carried down and fitted to top of annular belt or casing which is formed on top of purifier G and which stands some distance up from the purifying and sealing water to form an air-space. Where two vacuum-tanks E are in operation and connected by suction-pipes $a\,a$, the suction-pipes are each provided with butterfly or other simple form of valve $a'$ for the purpose of shutting off either vacuum-tank E when desired. Upon air-pumping engines D being put in operation a partial vacuum of five pounds or thereby to the square inch is made in the vacuum-chamber H in connection with purifier G through the pipes H' H' and in the overhead vacuum-tank E through the connecting-pipes $a\,a$. The dust-laden air is drawn down the pipes $a\,a$ and through the seal of water in the purifier G, which traps the dust, the purified air passing on to the air-pumps D through the vacuum-chamber H and pipes H' H'. The purifying-water containing the trapped dust and other material is let off as desired through pipe G', fitted to the under side of discharge-valve $G^2$ and fitted to side of barge. We keep the water from freezing in the purifier and the discharge-valve from getting jammed by ice in cold climates by admitting steam to each from steam-pipes $G^3$ and $G^5$, regulated by valves $G^4$ and $G^6$. Baffles $g$ and $g'$, under the suction-pipes H' H' and $a\,a$, are fitted, and in order to ascertain without doubt the exact position of the water in the purifier G large glasses $g^2$ are fitted on outside of casing. We fill the purifier by pump from the bilge or from any other convenient source by a pipe connection $g^3$, or we may place the purifier $G^{10}$ under the water-level of the barge, as shown in Fig. 9, and allow it to be filled to its proper level by connecting it to side of barge by a pipe I with regulating-valve I', and the sludge and dirty water would be thrown overboard at convenient times by a centrifugal or other pump $I^2$ with pipe connection $I^3$, or we may allow a certain quantity of water, as found most suitable, to enter the purifier continuously and allow a common pump to draw the amount away continuously. Glass gages $g^2$ would be fitted to show the level of water in purifier and sufficient manhole-doors provided.

As shown in Fig. 10, we may supply the purifier with water direct from the condenser of engine D by a pipe J and have an overflow J' fixed to outside of purifier vessel $G^{11}$ to maintain the water at its proper level, and the overflow-pipe would need to be sufficiently long and sealed among the water outside to maintain the desired vacuum, or if the purifier were placed low down in the barge the circulating water might be run through it and be pumped away and discharged overboard after it had passed through the purifier. The purifier shown in this figure is on the "spray" principle, and consists of a long cylindrical or other shaped vessel $G^{11}$, with one or more diaphragm-divisions $j$, perforated with small holes, and having fitted to its under side the tail-pipe J', of sufficient diameter to allow the incoming water to get freely away and having its end sealed by carrying it well under the level of water outside of barge and of a sufficient height to counterbalance the vacuum maintained by the air-pumps D. A pipe $J^2$, taken from a little under the perforated diaphragm $j$, is led to the air-pump D, and a pipe $J^3$, fitted to the cylindrical vessel $G^{11}$ considerably lower down, coming from the vacuum-tank E overhead, containing the dust-laden air. We by one method force the water from the condenser of engine D through the pipe J up to an air-tight chamber above the top diaphragm $j$ in vessel $G^{11}$ and allow it to fall through the perforations in the diaphragm. A copious supply of water descending in the form of spray meets the dust-laden air as it ascends to the suction-pipe $J^2$, leading to air-pump, and washes the impurities well out of it, which are discharged through the tail-pipe J'. Copper gauze or other material may be inserted inside of the cylindrical vessel for the purpose of breaking up the water and mingling the air freely with it.

In the arrangement of purifier shown in Figs. 11 and 12 we trap most of the dust contained in the air by causing it to pass through revolving wet circular screens K', of preferably fine copper gauze-wire, working up to fully half their diameter in water contained in an air-tight case K and fixed to circular frames $K^2$ and made close-fitting to the circumference of the screens K' above the surface of the water, but with space at back and front and under to allow room for the air and the dust from the air. A cover $K^3$ is placed in front of case K for the purpose of putting in and taking out the screens, and sufficient doors are provided to allow for the gauze being cleaned or repaired. The air-suction pipe $a$ from the vacuum-tank E is led and fitted to the front side of case K and the air-suction pipe H' to air-pump D from back. When this purifier is placed low down in the barge, the water may be let into it through a pipe $k$ from side of barge, the entrance-water regulated by a ball-valve $k'$, contained in an air-tight cistern $k^2$, communicating with the main case K. For the discharge of the purifying-water contained in the case we fit a pipe $k^3$ to its under or lowest point and connect this to a common force-pump $k^4$, with the discharge leading by a pipe $k^5$ overboard. Upon the engines being started to work the air-pumps D for the purpose of making vacuum in the overhead tanks to lift the grain motion is communicated to the spindle L of purifier, on which are fitted the gauze-screens K'. These on being revolved among the water are moistened all over their surface, and the dust from the air, being drawn by the pumps D from the vacuum-tank E, is mostly caught on its passage through the meshes of the wet screens K' and is washed off the gauze and deposited among the water in the case as the screens revolve. The discharge-pump $k^4$ for the purifying-water may be kept working slowly continuously, the ball-valve $k'$ regulating the supply of the inlet-water to maintain the proper level, or the pump may be worked intermittently. This arrangement of ball-valve may be supplied to the other forms of purifiers, if desired. Brushes may be fixed inside of the case to clean the dust off the screens as they revolve, and instead of gauze-screens brushes or other fibrous material may be used which will allow of the passage of air through. For instance, fine thread, hemp, or cord may be woven or simply strung across the face of the revolving frame or frames, or, instead, louver-board openings may be formed and fixed in any convenient manner to the revolving circular frames, and these may be made of wood, iron, or other material, or simple baffle boards or plates may be employed and fitted in the frame to cause the dust-laden air to take a zigzag course on its passage through and by its impinging against them so deposit its dust on the wet surfaces. We may use any number of such screens in a case.

We claim as our invention—

1. Apparatus for elevating and discharging grain comprising a vacuum-chamber, and inlet-piping to said chamber for the grain to be elevated, in combination with a water-trap, and a vacuum-producing means, suitably connected to vacuum-chamber, whereby the grain and air are separated in the chamber and the dust particles, &c., are separated from the air in the water-trap substantially as described.

2. Apparatus for elevating and discharging grain, comprising a vacuum-producing means, a vacuum-chamber, pipes entering said chamber for the grain to be elevated, and a sieve in form of a chamber located above said pipes, and adapted to allow air, free from dust to be drawn through its meshes, substantially as described.

3. Apparatus for elevating and discharging grain comprising a vacuum-chamber, a rotating wheel-valve thereto and means to equalize the pressure between the different compartments of the wheel-valve and the vacuum-chamber before filling the compartments with grain substantially as described.

4. Apparatus for elevating and discharging grain comprising a vacuum-chamber, a wheel-valve in the lower part thereof, pockets in the wheel-valve, a pipe connecting said pockets to the vacuum-chamber to equalize the pocket and vacuum-chamber pressures prior to the loading of the pockets, and a valve in the pipe substantially as described.

5. Apparatus for elevating and discharging grain comprising a vacuum-chamber, a cradle, a wheel-valve working in said cradle and springs to cause said wheel to bear against said cradle as set forth.

6. Apparatus for elevating and discharging grain comprising a vacuum-chamber, a wheel-valve and protecting-plate $h^3$ secured to the walls of the chamber near the wheel-valve, as and for the purposes set forth.

7. Apparatus for elevating and discharging grain, comprising a vacuum-chamber, a wheel with vanes and a protecting means having a strip of rubber adapted to bear upon the vanes substantially as described.

8. Apparatus for elevating and discharging grain, comprising a vacuum-chamber, through which the grain passes, pumping means to create a vacuum in said chamber and a water-trap between the chamber and pumping means, substantially as described.

9. Apparatus for elevating and discharging grain, comprising a vacuum-chamber, a vacuum-producing means, a sieve in the chamber and a safety-door in the sieve opening inward, as and for the purpose set forth.

In testimony whereof we have signed our names to this specification in presence of the subscribing witnesses.

JOHN HAVILAND.
FREDERICK HENRY HAVILAND.
JOHN FARMER.

Witnesses to the signature of the said John Haviland:
G. C. WELLS,
S. GERALD GILL.

Witnesses to the signature of the said Frederick Henry Haviland:
WM. FANT,
H. HOLLOWAY.

Witnesses to the signature of the said John Farmer:
JOHN SIME,
R. C. THOMSON.